Nov. 11, 1930.　　　A. E. ADAM　　　1,781,311
DEVICE FOR AUTOMATIC ADJUSTMENT OF LIGHT PROJECTORS
Filed Oct. 11, 1927　　　4 Sheets-Sheet 3
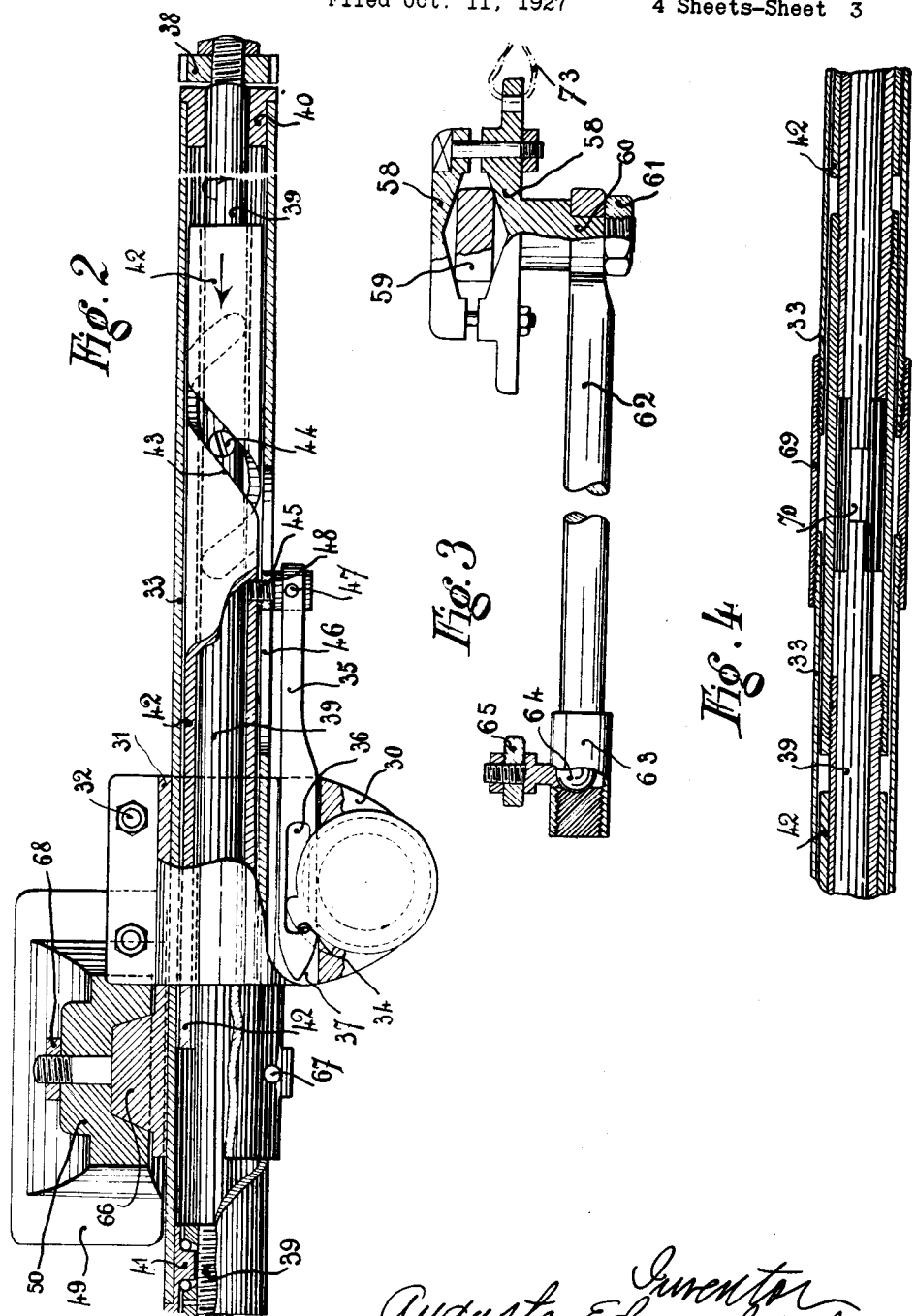

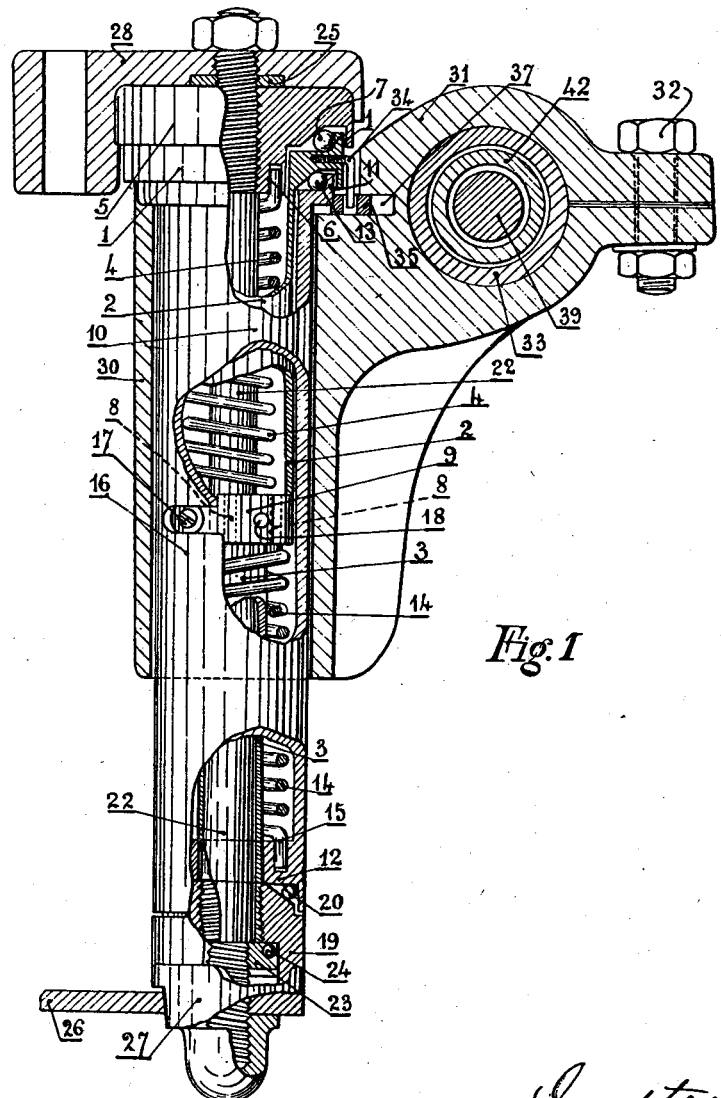

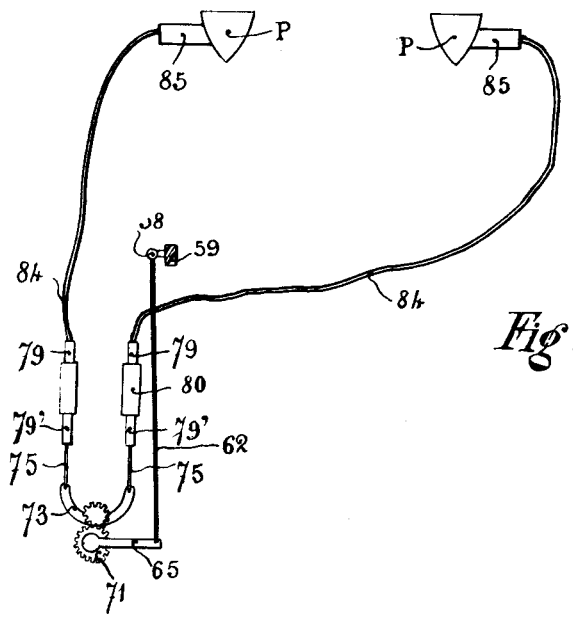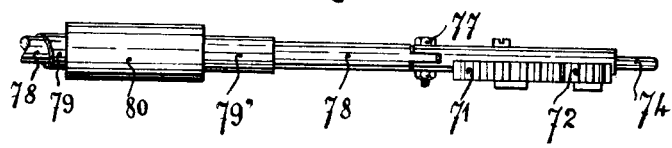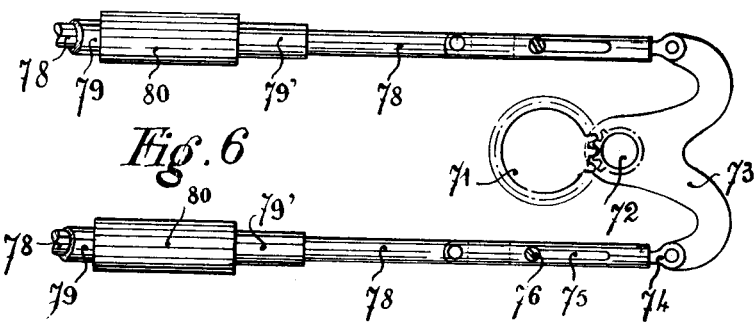

Nov. 11, 1930.  A. E. ADAM  1,781,311
DEVICE FOR AUTOMATIC ADJUSTMENT OF LIGHT PROJECTORS
Filed Oct. 11, 1927   4 Sheets-Sheet 4
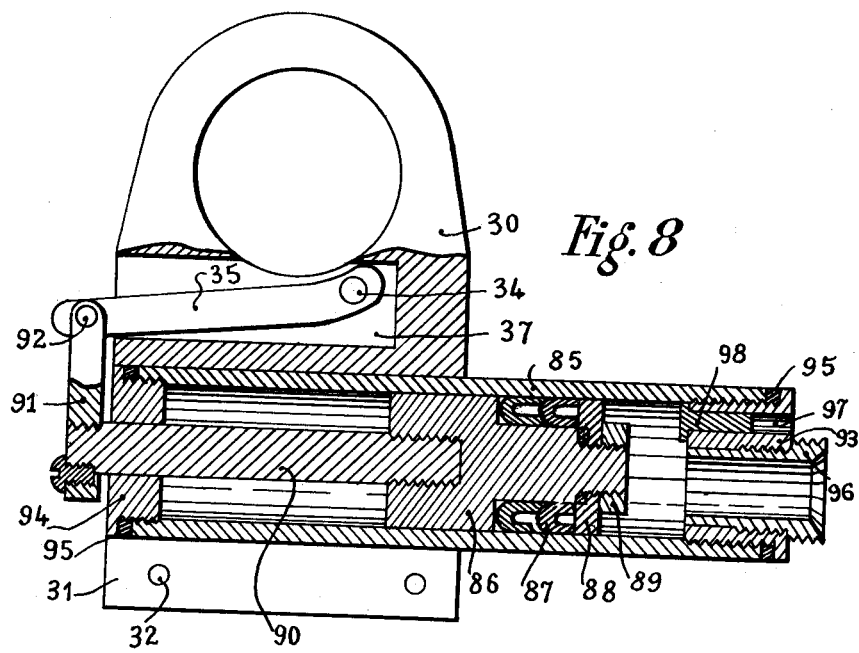
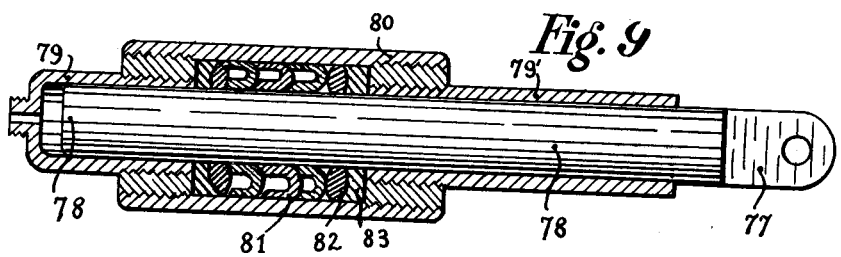
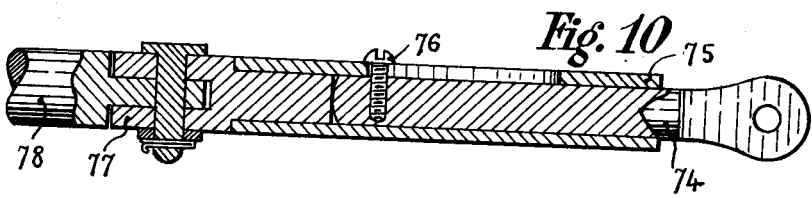

Patented Nov. 11, 1930

1,781,311

UNITED STATES PATENT OFFICE

AUGUSTE EDMOND ADAM, OF HOUILLES, FRANCE

DEVICE FOR AUTOMATIC ADJUSTMENT OF LIGHT PROJECTORS

Application filed October 11, 1927, Serial No. 225,587, and in France October 21, 1926.

According to the present invention the pivot of the light-projector comprises a combination of an automatic control and of a control by hand, the latter being integral with the projector and depending constantly on the first control by means of a spring, whilst a second spring tends constantly to restore the automatic control and hence the hand-control and the projector into the initial position, viz. the one where the pencil of rays is parallel to the longitudinal axis of the vehicle.

Light-projectors adjustable in this manner can be employed either as front light-projectors or as auxiliary projectors. In both cases the automatic control is effected by a universal cap fixed to the connecting or steering rod of the front wheels and adjustable at will, in a manner to permit a smaller or greater turning of the projectors.

According to the first executional mode, the automatic control of the projectors is realized by means of a transverse rotary rod contained in a tubular cross-piece between the protecting wings, a sleeve sliding on this tube, this sleeve being acted upon by a helicoidal plane and a roller integral with the rod and circulating in a rectilinear groove (or by any other analogous means such as endless screw).

The sliding sleeve actuates the projector through the medium of a link provided with a mortise into which engages a projection integral with the head of the support of the projector, in such manner that only the projector placed in the center of the turning movement is influenced by the handling of the steering rod.

According to a modified executional form, the automatic control of the projectors is realized through the medium of a transmission by an appropriate fluid, instead of the rigid elements formerly provided for this purpose.

In such case each projector is equipped with a small cylinder receiving a piston sliding therein and provided with punched leather and connected to its respective projector by means of a system of links.

The steering comprises a double device of compression pumps and each pump is connected to its projector by a suitable piping.

The employed fluid could consist of a mixture of glycerine and water, and even of air.

When steering in either direction, the liquid is forced into the cylinder of the corresponding projector; the pressure occasioned thereby pushes the piston controlling the projector and produces its rotation.

In the appended drawings:

Figure 1 is an elevation, partly in section, of the pivot supporting means of a left projector.

Figure 2 is a longitudinal section of the device controlling the rotation of the projector.

Figure 3 is a collar and ball and socket joint for the automatic control.

Figure 4 a modified system of fitting of the tube forming cross-piece and rendered extensible.

Figure 5 a schematic view indicating the arrangement for a hydraulic transmission.

Figures 6 and 7 a frontal and a lateral view of a device controlling the two compression pumps.

Figure 8 in longitudinal section the piston controlling the projector.

Figure 9 the piston of the compression pump in section, and

Figure 10 a controlling sliding piece in section.

Each pivot of the projector (Figure 1) comprises a small basin 1 prolonged by a sleeve or chamber 2 terminated by a tube 3 of a reduced diameter.

With the left projector, (if supposing circulation to the right) the same comprises in combination an automatic control (for turning movements) and a hand-control (corresponding to the legal prescriptions, for example to the code for travelling on French roads).

The chamber 2 receives, for the left projector, a first spring 4 wound to the left, viz. the sense of its windings being from right to the left.

This spring is suppressed for the right projector, viz. the one remaining inactive if effecting a "code"-steering.

The upper extremity of this spring penetrates into one of four recesses or cells 6 provided in the support of the projector or headlight 5 fitting into the basin 1, a set of bails 7 being interposed between these elements.

The lower extremity of the spring 4 penetrates into one of four holes 8 pierced vertically in the bottom part 9 of the chamber 2. In this way the spring is permitted to work on torsion.

The chamber 2 and the tube 3 are placed in a sheath 10 provided at its upper part with a basin 11 and at its lower part with an inner annular shoulder 12. A second set of balls 13 is intercalated between the basin 1 and the basin 11 of the sheath 10.

A spring 14 is disposed in the sheath 10, over the tube 3 and having its windings wound from left to right for the left projector, and to the left for the right projector.

The upper extremity of this spring penetrates into one of vertical holes 8 pierced in the bottom 9 of the chamber 2 and its lower extremity enters a hole 15 pierced vertically in an inner shoulder 12 of the tube 3.

This spring works on torsion, but in the reverse direction to the spring 4, by reason of the reverse winding of said springs.

A transverse slot is made in the sheath 10 and receives and guides a screw 17 fixed in one of the holes 18 pierced horizontally in the bottom 9 of the chamber 2.

This screw is placed in such manner as to constantly maintain the spring 14 in tensioned condition while limiting the return movement exerted by the same upon the support of the projector or headlight to a fixed position determined by adjustment and such that the light rays are directed parallel to the longitudinal axis of the vehicle as long as the same continues moving on a straight road.

The sheath 10 is maintained upon the tube 3 by means of a conical support 19 screwed on the lower part of the tube 3. A ball-set 20 is interposed between the shoulder 12 and the cone 19.

The sheath 10 is lodged in a sleeve 30 provided at its upper part with a collar 31 fastened by a bolt 32 on a tube 33 forming a cross-piece between the mud-protecting wings of the car (Fig. 2).

A claw 34 fixed outwardly on the basin 1 terminating the chamber 2, engages in the lock 36 (Fig. 2) of the link 35 for automatic steering, this claw or the like effecting its rotation in a notch or the like provided in the supporting surface of the sleeve 30, while the link 35 slides across a notch or the like 37 provided for this purpose in the head of the sleeve 30. By the play of the claw in the notch or slot, only the headlight placed in the center of the turning motion will be influenced by the steering action.

A vertical shaft 22 threaded to the right in its upper part and to the left at its lower part is screwed into the support 5 of the projector and traverses the whole.

A cone 23 screwed upon the lower part of the shaft 22 maintains the same in the interior of the chamber 2 and of the tube 3. A ball-bearing set 24 separates the cone 23 from the bottom part 19 provided with a basin.

At the upper part of the shaft 22 two notches are provided, tangential and parallel, which permit the fixation of a U-like basin 25 preventing loosening of the support 5 of the the headlight on the shaft 22.

At the lower part of this rod is screwed, only for the left support, a link 26 connected to the device for hand-control, the stroke whereof is limited by an abutment 27 fixed to the part 19, the spring 4 being tensioned in this way in a constant manner.

The whole is so combined that the movements, contrary to each other, impede the the loosening of the different elements; and hence, the direction of rotation is dextrorsum if the device is acted upon automatically, and senestrorsum when manually operated.

The whole set of the basins and cones with the balls ensures the stability of the apparatus, no trepidation being transmitted to the projector remaining hence in a perfectly rigid state.

The upper end of the shaft projects above the support sufficiently to permit the placing of the different fixing means corresponding to the different types of the projectors commonly used.

In Fig. 1 for example, 28 represents the fixation head of projectors equipped with a rod (in the kind of projectors of the type Marchal) and a fixation nut.

The automatic control of the link 35 is obtained by means of a collar with two clamping members 58 (Fig. 3) fixed on the steering rod 59 and transmitting the movements of the latter to the device controlling the pivot of the projector or headlight through the medium of a rod 62 fixed on the bolt 60 of the collar 58 by a nut 61 (preferably by winged nuts in order to render possible disconnection of the rod 62 from the collar 58 in day-time, the projectors needing no pivotal movement). The rod 62 is terminated by a sleeve 63 receiving a ball 64 attached to a link 65 actuating, through the medium of a suitable reduction gear enclosed in a carter, a pinion 38 (Fig. 2) fixed at the extremity of the central controlling shaft 39 revolvable within the tube 33 and guided at one extremity by a bush 40 and at the other extremity by a bush 41 equipped with a double set of bearing balls.

A sleeve 42 slides on the shaft 39, each extremity of the former being provided with a helicoidal slope 43 destined to transform, with the aid of a roller 44 fixed on the shaft 39 the rotary motion of the latter into a longitudinal motion of the sleeve 42. Instead of obtaining this movement by means of the helicoidal slope, an endless screw could be utilized fulfilling the same purpose.

The translatory movement of the sleeve 42 is regulated by means of a roller 45 fixed on the sleeve 42 and sliding in a slot 46 provided in the cross-piece tube 33 at the point corresponding to each tail of the projector and being of a suitable length in order to permit the necessary rotary motion to each projector.

The link 35 of the automatic control of the projector is articulated at 47 on the axial rod 48 of the roller 45.

The cross-piece tube 33 is fixed on the mud-protecting wings at the front of the vehicle by a plate 49 carrying a basin 50 into which engages a cone 66 which is fixed on a sleeve 60 through which the tube 33 extends and which sleeve is secured to said tube by means of a key 67, said cone has a stud 60ª which projects through a central opening in the basin 50 and through which is screwed a nut 68 to secure the parts 50, 66 together and hence secure the tube 33 to the member 49. Reinforcing legs could be added for increasing the rigidity of the system.

The tube 33 as well as the elements contained within the latter could be rendered extensible with the aid of a fitting represented in Fig. 4 and comprising two shells or sheaths with opposite threads and a double cap 70.

The working of the device is as follows:

If moving in a straight line, the spring 4 is so tensioned as to keep the link 26 constantly in contact with the abutment 27 and thus render possible the transmission of the movements of the link 35 to the projector, for automatic control thereof. This link is constantly under the tension of the spring 14, which is active to normally maintain the link in a position corresponding to the straight ahead lighting in the longitudinal axis of the vehicle, and determined by the stop screw 17.

When moving the steering rod 59 in one direction, the rod 62 will be either drawn or pushed by said rod and the shaft 39 will be turned in one or the other direction by the pinion 38 and its connections, the sleeve 42 receiving a longitudinal movement and imparting the same to the link 35. In case of a pushing motion on the link 35, the pin 34 is simultaneously displaced and moves idly in the slot 36, but the pivot of the projector is not acted upon, while in case of a pulling motion the link 35 is moved under the tension of the spring 14 and the link 26 (for hand-control) connected to said spring 14 through the former by the spring 4, follows its movement and causes rotation of the shaft 22 and hence of the projector. The rods for control by hand follow the movement of the link 35.

At the end of the movement the device regains its position and the spring 14 restores the projector to its initial straight ahead position.

For steering required by the official road-prescriptions the driver controls the link 26 by means of a lever analogous to the hand braking lever; this lever pulls the link 26, disconnects the same from the abutment 27, and thereby causes rotation of the shaft 22, and, dominating the spring 4, the latter restores the link 26 to its contact with the abutment 27 as soon as manual control ceases.

During this operation the lighting circuit is changed owing to the fact that a special commutator is provided which while leaving the left or the auxiliary projector fully illuminated, reduces the luminosity of the other projector or projectors. This handling produces hence, at the same movement, the deviation of the luminous pencil of one projector to the right and reduces the light of the other projectors. After the end of the handling the lighting becomes again normal.

The transmission of movement between link 65 actuated by the steering of the wheels, and the link 35 controlling the pivot of the projector instead of being effected by rigid means such as reducing gear, rotary rod 39, and sliding sleeve 42, could be realized by a hydraulic transmission or by any appropriate fluid.

In such case the link 65 is actuated by a gear 71, 72, a beam 73 to both extremities of which are articulated rods 74 (Fig. 5) sliding in sleeves 75 and carrying projections 76 which operate each in a slot provided in said sleeve. (Fig. 10).

At the extremities of these sleeves 75 are articulated, to lugs 77 the compression pistons 78 guided in the cylinders 79, 79' (Fig. 9).

80 is a cylinder screwed on the tube 79 and comprising or containing the stuffing elements 81, 82, and 83.

The cylinders 79 serving to guide the pistons 78 are connected at the extremities by flexible tubes 84 (Fig. 5) to projectors P.

The device for the actuation of the projectors comprises a small cylinder 85 in which is a piston 86; the latter carries fittings 87, 88 and 89 arranged to prevent leakage; at the other extremity of the piston a rod 90 is provided tending to control the rotation of the projector by means of an arm 91 at the end of which is articulated, at 92, the link 35ª controlling the pivot of the projector.

The extremities of the cylinder 85 are closed by bushes 93 and 94, tightening washers 95 being preferably intercalated. To the bush 93 is attached the nozzle 96 of a tube 84 admitting fluid and a nozzle 97 for a tube to compensate for eventual losses of the liquid and equipped with a valve 98 retaining the liquid at the moment of compression. A storage reservoir (not shown) communicates with the tube 97 in order to counteract eventual leakages and to ensure constant replenishing of the apparatus.

The bush 94 serves simply to guide the rod 90. The hydraulic control could be replaced by compressed air under the same conditions; it is equally possible to suppress, if using compressed air, the reducing gear and the pumps and to replace them by a simple cock branched to an air-container and controlled by the steering mechanism, the degree of opening of the cock being variable.

What I claim is:—

1. Dirigible headlight apparatus comprising steering rod actuated mechanism including a movable element, a headlight support having a shaft, a spring connected to said support, a second spring arranged reversely to the first named spring, a member mounted for rotation and to which one end of the second spring is attached, a member mounted for limited rotation independently of the first named member and of the headlight support and to which both of said springs are attached, a manually operable member 26 arranged to normally hold the first named spring in tensioned condition and connecting means between the movable element of the steering rod actuated mechanism and the second named revoluble member, said connecting means providing idle movement of said movable element in one direction under the tension of the second spring and turning said second named revoluble member and hence tensioning said second spring when said movable element moves in the reverse direction.

2. Dirigible headlight apparatus as claimed in claim 1, in which said connecting means comprises a pin attached to said second named revoluble member and a link engaged by said pin and attached to said movable element.

3. Dirigible headlight apparatus as claimed in claim 1, in which said steering rod actuated mechanism includes a cylinder and a fluid pressure operated piston in said cylinder and to which said link is connected.

4. Dirigible headlight apparatus as claimed in claim 1, in which said steering rod actuated mechanism includes a cylinder and a fluid pressure operated piston in said cylinder and to which said link is connected and also including means actuated by the steering rod to supply fluid under pressure to said cylinder.

5. A pair of light projectors each mounted pivotally independently of the other, fluid pressure actuated means for each projector to actuate the same, a steering rod actuated member mounted for pivotal movement, a pair of fluid pressure actuated mechanisms each including a cylinder and a piston, a conduit connecting the cylinder of each said mechanism to one of the first named fluid pressure actuated means, and means connecting each piston to said steering rod actuated member, each said connecting means being longitudinally extensible in one direction so that when the piston of one fluid pressure actuated mechanism is moved in one direction by said steering rod actuated member the corresponding fluid pressure actuated means of one light projector is operated to move said light projector and the other fluid pressure operated mechanism connected to the fluid pressure actuated means of the other light projector remains inoperative and hence the light projectors are moved each independently of the other according to the direction of movement of the steering rod.

6. Apparatus as claimed in claim 5, including also a fluid reservoir to compensate for losses of fluid by leakage and the like.

In witness whereof I affix my signature.

AUGUSTE EDMOND ADAM.